US006561307B1

(12) United States Patent
Brill et al.

(10) Patent No.: US 6,561,307 B1
(45) Date of Patent: May 13, 2003

(54) INDEPENDENT SUSPENSION STEERING SYSTEM

(75) Inventors: Lawrence D. Brill, Westerville, OH (US); Malcolm Green, Granville, OH (US); Steven E. Hunter, Lancaster, OH (US); Duy Lam, Baltimore, OH (US); Ragnar H. Ledesma, Sterling Heights, MI (US); Michael E. Schuster, Rochester Hills, MI (US); Tomaz Dopico Varela, Gahanna, OH (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 10/034,744

(22) Filed: Dec. 28, 2001

(51) Int. Cl.$^7$ .................................................. B62D 5/00
(52) U.S. Cl. ........................ 180/444; 180/443; 180/447; 180/402
(58) Field of Search ................................. 180/446, 444, 180/443, 402, 403, 411, 408, 412, 414, 447

(56) References Cited

U.S. PATENT DOCUMENTS

| | | | | |
|---|---|---|---|---|
| 3,620,321 A | * | 11/1971 | Thibodeau | 180/46 |
| 4,445,586 A | * | 5/1984 | Schneider | 180/132 |
| 5,348,111 A | * | 9/1994 | Williams et al. | 180/140 |
| 5,653,304 A | * | 8/1997 | Renfroe | 180/402 |
| 5,734,570 A | * | 3/1998 | Arlandis | 364/424.052 |
| 5,791,432 A | * | 8/1998 | Fushimi et al. | 180/412 |
| 5,813,487 A | * | 9/1998 | Lee et al. | 180/65.1 |
| 5,899,292 A | * | 5/1999 | Paul et al. | 180/491 |
| 5,904,365 A | * | 5/1999 | Dillon | 280/419 |
| 6,131,691 A | * | 10/2000 | Morch | 180/418 |
| 6,371,243 B1 | * | 4/2002 | Donaldson et al. | 182/69.4 |
| 6,488,114 B1 | * | 12/2002 | McMahon et al. | 180/414 |

* cited by examiner

*Primary Examiner*—Lesley D. Morris
*Assistant Examiner*—Tony Winner
(74) *Attorney, Agent, or Firm*—Carlson, Gaskey & Olds

(57) ABSTRACT

A steering system is provided for a vehicle including a frame. Upper and lower control arms have first end portions that are pivotally supported on the frame at first spaced apart connections. The control arms also each include second end portions that are pivotally connected to an intermediate support member at second spaced apart connections. A steer knuckle is pivotally supported by the intermediate support member at third spaced apart connections that define a king pin axis. A drive motor is mounted on the intermediate support member and is coupled to the steering knuckle to rotate the steering knuckle about the king pin axis relative to the intermediate support member. A gear set may also be used in conjunction with the drive motor and steering knuckle. The intermediate support member is constrained against forward and aft movement, but is permitted to move upward and downward with the control arms.

15 Claims, 1 Drawing Sheet

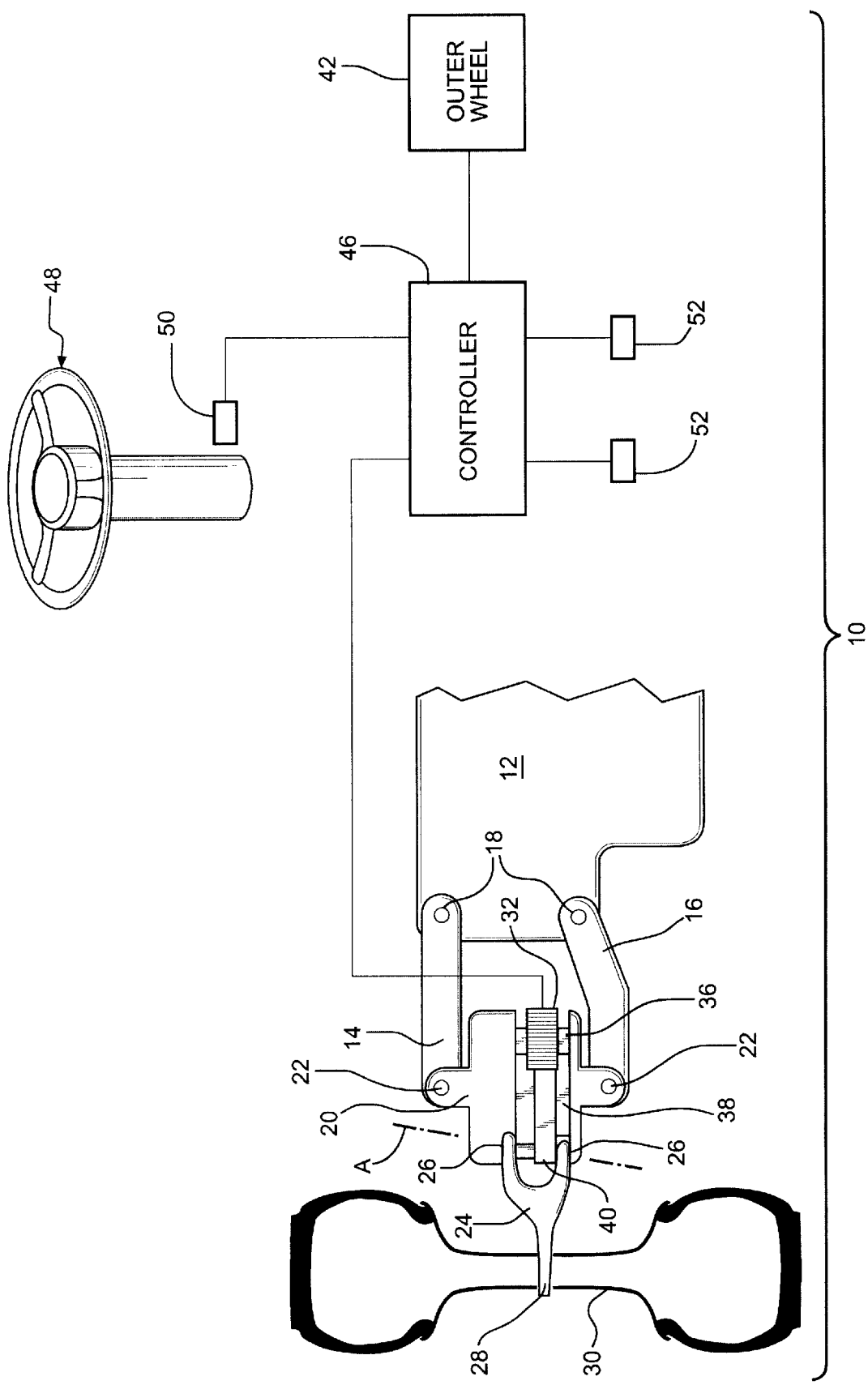

INDEPENDENT SUSPENSION STEERING SYSTEM

BACKGROUND OF THE INVENTION

This invention relates to a steering system for an independent suspension, and more particularly, the invention relates to a so-called steer-by-wire steering system.

Commercial vehicles such as buses and trucks often incorporate unique steering systems. Buses and trucks must typically make very sharp turns which complicates the design of the steering systems. For example, a mechanical steering system typically includes a rack and pinion connected to a steering knuckle by cross tubes and tie rods. The rack and pinion steering system manipulates the steering knuckles in response to steering input from the steering wheel. Mechanical steering components must be packaged in the limited space available around the vehicle frame. Furthermore, packaging of the mechanical steering components may limit the maximum allowable turning angle due to lock up or binding of the steering components when turning the steering knuckles. That is, interference between the steering components and frame may prevent a desired turning angle from being achieved.

Packaging of mechanical steering systems may be further complicated when using independent suspension systems such as arrangements utilizing upper and lower control arms. To this end, so-called steer-by-wire systems have been incorporated to replace the mechanical steering components traditionally used. However, these steer-by-wire systems may be relatively complicated and may encounter some of the same packaging problems confronted with mechanical steering systems. For example, many steer-by-wire systems utilize hydraulic cylinders or numerous interrelated linkages coupled to the steering knuckle to effectuate a turn. Therefore, what is needed is a compact steer-by-wire system for an independent suspension.

SUMMARY OF THE INVENTION AND ADVANTAGES

The present invention provides a steering system for a vehicle including a frame. Upper and lower control arms have first end portions that are pivotally supported on the frame at first spaced apart connections. The control arms also each include second end portions that are pivotally connected to an intermediate support member at second spaced apart connections. A steer knuckle is pivotally supported by the intermediate support member at third spaced apart connections that define a king pin axis. A drive motor is mounted on the intermediate support member and is coupled to the steering knuckle to rotate the steering knuckle about the king pin axis relative to the intermediate support member. A gear set may also be used in conjunction with the drive motor and steering knuckle. The intermediate support member is constrained against forward and aft movement, but is permitted to move upward and downward with the control arms.

Accordingly, the above invention provides a compact steer-by-wire system for an independent suspension.

BRIEF DESCRIPTION OF THE DRAWINGS

Other advantages of the present invention can be understood by reference to the following detailed description when considered in connection with the accompanying FIGURE depicting the present invention independent suspension steering system.

DETAILED DESCRIPTION OF THE PREFERRED EMBODIMENT

An independent suspension steering system 10 is shown in the FIGURE. The system 10 includes a frame 12 to which upper 14 and lower 16 control arms are connected at first connections 18. An intermediate suspension member 20 is connected to the upper 14 and lower 16 control arms at second spaced apart connections 22. The member 20 moves upward and downward with the upper 14 and lower 16 control arms. However, the member 20 is constrained from moving forward and aft. It should also be understood that the present invention may be used with other independent suspension arrangements.

The intermediate suspension member 20 supports a steer knuckle 24 by third spaced apart connections 26 that define a king pin axis A. The knuckle 24 includes a spindle 28 supporting a wheel 30. As with the prior art, rotation of the knuckle 24 about the king pin axis A to a desired steering angle will steer the vehicle. A motor 32 may be mounted on the member 20 to manipulate the knuckle 24 and rotate the knuckle 24 relative to the member 20. A gear set may be used between the motor 32 and the knuckle 24 to increase the mechanical advantage and reduce the size of the motor 32 needed. For example, a gear 36 may be driven by the motor 32 to drive an idler gear 38. A gear 40 may be fixed to a portion of the knuckle 24 and coupled to the idler gear 38. In this manner, rotational drive from the motor 32 will rotate the knuckle 24 relative to the member 20.

Only one wheel has been described above, however, the system 10 also includes an outer wheel 42, which is represented schematically in the Figure. A controller 46 is connected to the motor of each of the wheels. A steering sensor 50 is connected to the controller 46 and senses input from a steering device 48. Other sensors 52 may provide input from the controller 46 that relate to steering control. The sensor 50 produces a steering input signal corresponding to a desired steering angle. The controller 46 receives the steering input and sends a command signal to the motors 32 based upon the steering input to achieve the desired steering angle. Since the system 10 utilizes motors that may be actuated independently, steering errors found in a conventional mechanical steering system such as those due to jounce roll, and Ackerman effects may be eliminated. For example, an inside turning radius may be calculated for an inside wheel and a different steering angle may be calculated for the outside turning radius wheel to achieve a desired angle for each of the wheels to reduce tire wear.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A steering system for a vehicle comprising:
   a frame;
   upper and lower control arms each having first and second opposing end portions with said first end portions pivotally supported by said frame respectively at first spaced apart connections;
   an intermediate support member pivotally supported by said second end portions respectively at second spaced apart connections;

a steer knuckle pivotally supported by said intermediate support member at third spaced apart connections defining a king pin axis; and a drive motor mounted on said intermediate support member coupled to said steer knuckle rotating said steer knuckle about said king pin axis relative to said intermediate support member.

2. The steering system according to claim 1, wherein a gear set is coupled between said drive motor and said steer knuckle.

3. The steering system according to claim 2, wherein said gear set includes a gear affixed to a portion of said steer knuckle.

4. The steering system according to claim 1, wherein said intermediate support member moves in a upward and downward with said control arms and is constrained by said control arms from moving forward and aft.

5. The steering system according to claim 1, wherein said drive motor is electric.

6. The steering system according to claim 1, further including a steering input connected to said controller producing a steering input signal corresponding to a desired steering angle, and a controller connected between said steering input and said motor receiving said steering input signal and sending a command signal to said motor to achieve said desired steering angle.

7. The steering system according to claim 6, wherein said controller sends said command signal to said motor at an inside turning radius wheel and sends a second command signal to another motor at an outside turning radius wheel to achieve a desired Ackerman angle.

8. A steering system for a vehicle comprising:

a frame;

a lower control arm having first and second opposing end portions with said first end portion pivotally supported by said frame at a first connection;

an intermediate support member pivotally supported by said second end portion at second connection;

an upper suspension member interconnected between said frame and said intermediate support member;

a steer knuckle pivotally supported by said intermediate support member at third spaced apart connections defining a king pin axis; and a drive motor mounted on said intermediate support member coupled to said steer knuckle rotating said steer knuckle about said king pin axis relative to said intermediate support member.

9. The steering system according to claim 8, wherein said upper suspension member is an upper control arm.

10. The steering system according to claim 8, wherein a gear set is coupled between said drive motor and said steer knuckle.

11. The steering system according to claim 10, wherein said gear set includes a gear affixed to a portion of said steer knuckle.

12. The steering system according to claim 8, wherein said intermediate support member moves in a upward and downward with said control arms and is constrained by said control arms from moving forward and aft.

13. The steering system according to claim 8, wherein said drive motor is electric.

14. The steering system according to claim 8, further including a steering input connected to said controller producing a steering input signal corresponding to a desired steering angle, and a controller connected between said steering input and said motor receiving said steering input signal and sending a command signal to said motor to achieve said desired steering angle.

15. The steering system according to claim 14, wherein said controller sends said command signal to said motor at an inside turning radius wheel and sends a second command signal to another motor at an outside turning radius wheel to achieve a desired Ackerman angle.

* * * * *